Oct. 10 1933.  D. M. SMALLE  1,930,213
APPARATUS FOR PRESERVING ORANGE JUICE
Original Filed Dec. 4, 1930
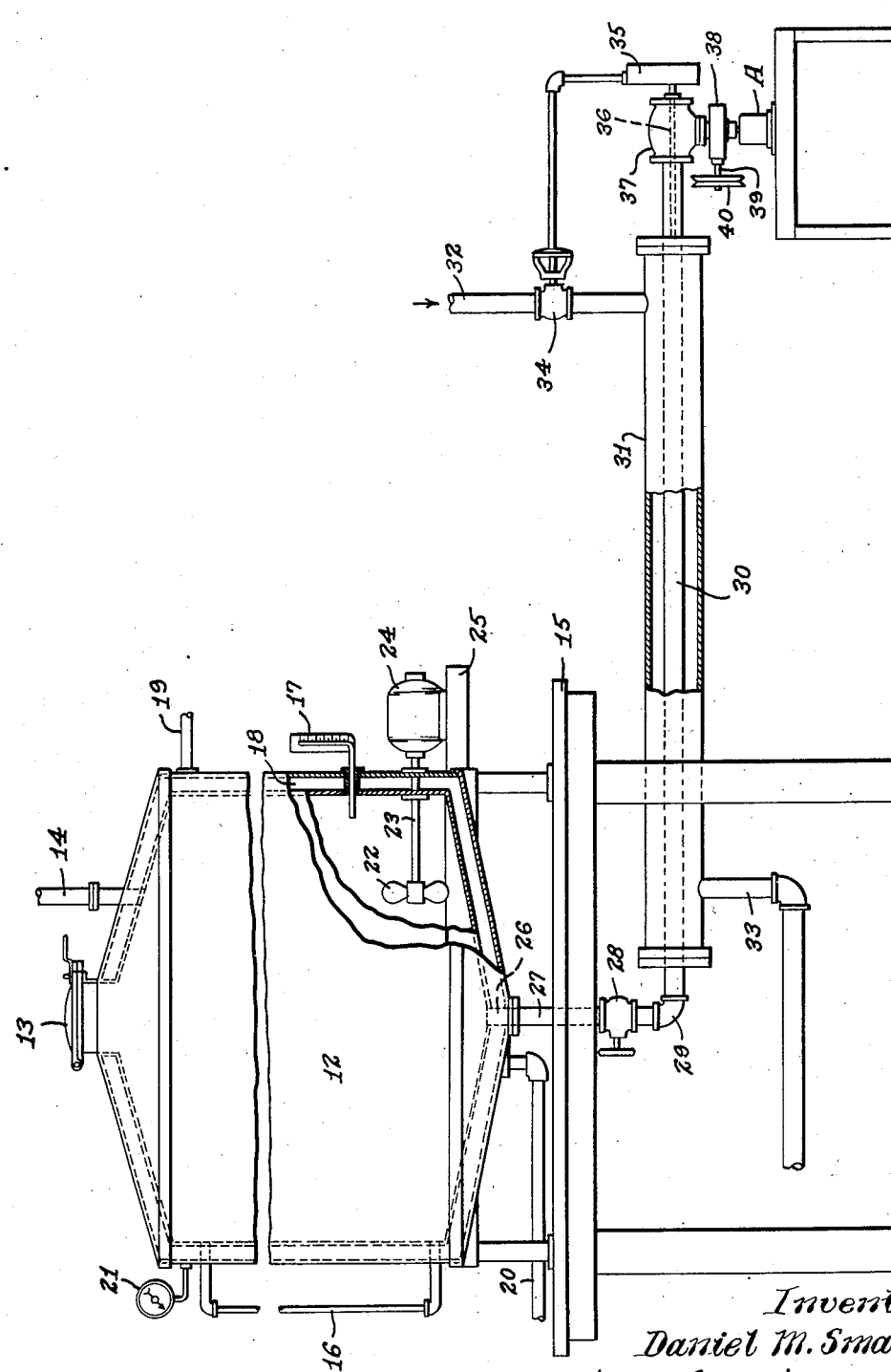
Inventor
Daniel M. Smalle
by
Attorney Patented Oct. 10, 1933

1,930,213

UNITED STATES PATENT OFFICE 1,930,213

APPARATUS FOR PRESERVING ORANGE JUICE

Daniel M. Smalle, Orlando, Fla., assignor of six-tenths to Dr. P. Phillips Company, Orlando, Fla., a corporation of Florida Original application December 4, 1930, Serial No. 499,914. Divided and this application November 6, 1931. Serial No. 573,391

2 Claims. (Cl. 257—208)

This invention relates to the preservation of unclarified orange juice, in sterile condition, and has particular reference to apparatus for so effecting the treatment of the juice as to prepare it for sealing in suitable containers.

As explained in my application Serial No. 499,914, filed December 4, 1930, of which application the present one is a division, and which application resulted in Letters Patent 1,838,517, December 29, 1931, the methods heretofore employed in the treatment of orange juice for supply to the trade and users have not been such as to ensure preservation of the juice for any considerable length of time in a condition retaining the natural color, flavor and vitamins.

I have discovered that by causing the juice, after treatment in a heated tank to prevent fermentation from starting in, to flow continuously through a heated conduit to the container-filling mechanism, the natural flavor and the healthful vitamins of the fresh fruit are retained.

The accompanying drawing is a side elevation of the essential parts of one embodiment of my improved apparatus for carrying out the process hereinafter described, the figure of the drawing being partly broken out and in section.

The apparatus includes a storage tank 12 of such size as may be preferable, having a closable cover 13, a pipe for the supply of juice to the tank being indicated at 14, said tank being mounted on a platform 15. The tank is equipped with a depth-gage glass 16, and a visible thermometer 17, and is double-walled to provide a steam jacket 18 to which steam may enter through a supply pipe 19 and from which it may pass through an outlet pipe 20. The usual steam gage is indicated at 21. The parts of the apparatus so far described may be understood as of a well-known construction, and the same may be said of the juice agitator 22, the shaft 23 of which is rotated by a motor 24 mounted on a bracket 25.

The tank outlet 26 is connected by a pipe 27, having a valve 28, to an elbow 29, the latter being connected to a pipe 30 which, with other parts presently described, constitutes an important feature of my improved apparatus. Said pipe may be of greater length than illustrated, relatively to the size of the rest of the apparatus. Said pipe is kept at an approximate temperature as explained hereinafter by suitable means, preferably steam. For this purpose in the embodiment of the invention illustrated, the pipe 30 is enclosed in an outer pipe 31 to provide a steam jacket to which a steam supply pipe 32 leads, and from which the steam may escape through an outlet pipe 33.

It is important that the temperature of the pipe 30 shall be automatically controlled, for reasons presently explained. For this purpose, the apparatus illustrated includes an automatic valve 34 of well-known type, in the steam-supply pipe 32, said valve being controlled by a temperature governor 35 the thermostatic strip 36 of which, or equivalent, is located in a casing 37 through which the juice passes to an automatic timed measuring filler apparatus 38 of well-known type, the shaft 39 of said filler having a pulley by which the filler is driven by a suitable motor not necessary to illustrate. The filler delivers the juice to suitable containers such as cans, one of which is illustrated at A on a suitable support which, in practice, usually effects automatic presentation of successive containers to position under the filler.

In using the apparatus described, the orange pulp and juice which have been first passed through a suitable strainer to separate the seeds and rag therefrom, is supplied to the tank 12 which is enamel-lined or of acid-resisting material, and while in said tank is subjected to a temperature of 50° to 60° C. for a period of 5 to 15 minutes, and held therein at a temperature sufficiently high to prevent the starting of fermentation, and is constantly agitated in the tank.

Upon opening the valve 28, the juice passes through the pipe 30 which is of acid-resisting material and which is kept at such temperature that the continuously flowing juice, on its way to the container-filling apparatus, is raised to a temperature of 65° to 75° C., but so regulated by the temperature control 35 that the flowing juice will at no time reach a temperature higher than is necessary to kill the germs of fermentation, yeast, etc., but which temperature is low enough to retain in the juice the natural flavor and the healthful vitamins of the fresh fruit. To effect this, it is essential that the flow of juice shall be continuous.

The apparatus is so synchronized by the operation of the container-filling apparatus of such type as indicated at the right of the figure of the drawing, that the temperature of the flowing juice in the pipe 30 never varies materially.

By the use of my improved apparatus, I am able to fill containers with orange juice which retains all of the esters and vitamins, and with the natural flavor and color preserved indefinitely.

Oxidation, and enzymic action of pulp in the juice, is prevented.

Having now described my invention, I claim:—

1. Apparatus for effecting the preservation of citrus fruit juice, said apparatus comprising the combination of members operatively connected in the following sequence, viz, a supply tank, an unobstructed pipe leading directly from said tank, said pipe being provided with a jacket to which a steam pipe having a valve leads, a casing to which said pipe from the tank leads, and a timed measuring filler apparatus for receiving the juice from said casing, the said casing containing means for automatically controlling the supply of steam to said jacket, the entire conduit for the juices from the supply tank to said casing being closed against access of air thereto, the combination being characterized by provisions for subjecting the juice, while flowing continuously and evenly to a uniform temperature for effecting pasteurization of the juice while traveling.

2. Apparatus for effecting the preservation of citrus fruit juice, said apparatus comprising the combination of members operatively connected in the following order, viz, a supply tank having means for heating it, an unobstructed pipe leading directly from said tank and enclosed in a steam chamber, a casing to which said pipe from the tank leads, and a timed measuring filler apparatus for receiving the juice from said casing, thermostatic means being provided for controlling the steam in said chamber by the temperature of the juice flowing through said casing on its way to the measuring filler apparatus, the entire conduit for the juice from the supply tank to the filler apparatus being closed against access of air thereto.

DANIEL M. SMALLE.